UNITED STATES PATENT OFFICE.

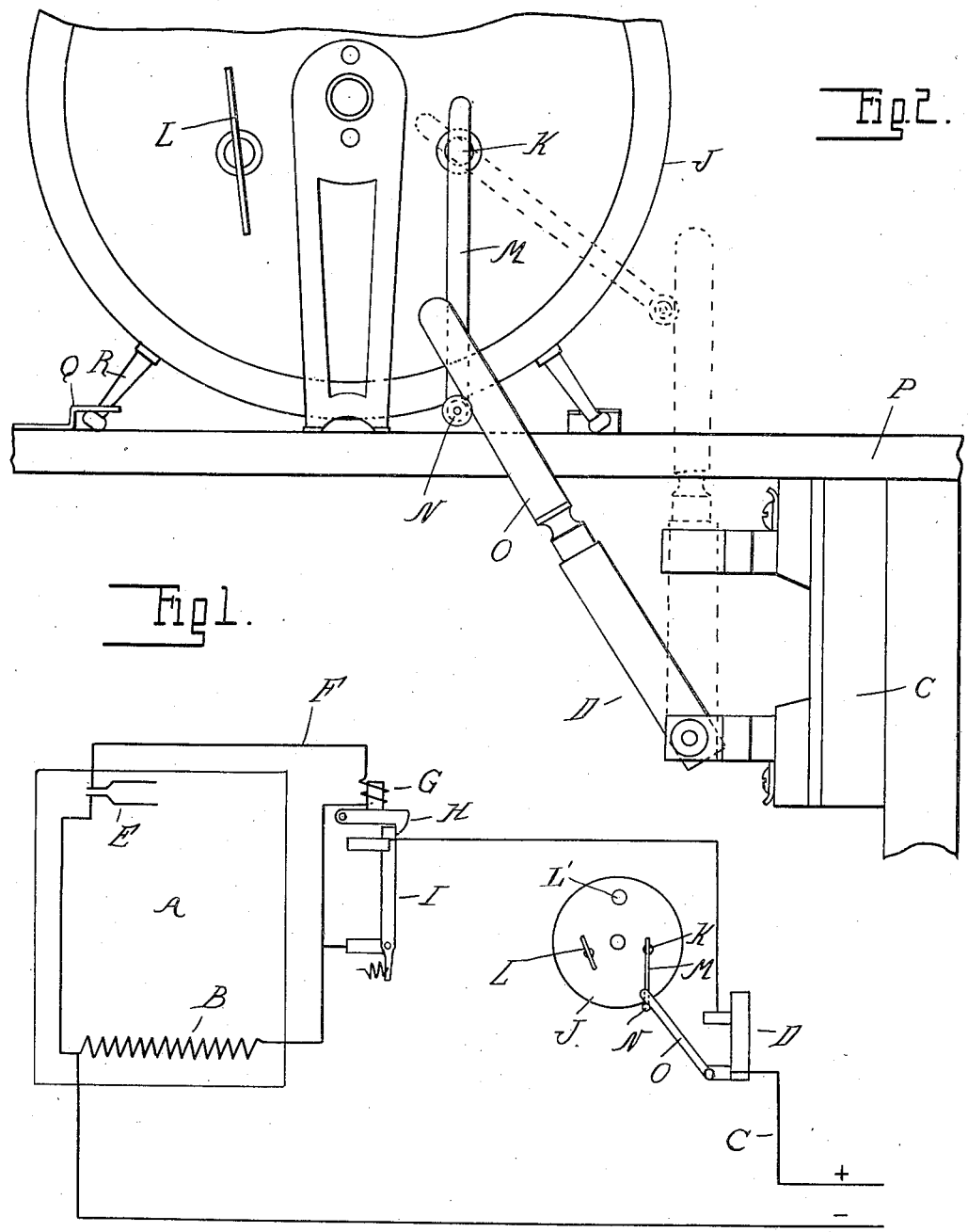

LLOYD GROFF COPEMAN, OF FORT SMITH, ARKANSAS, ASSIGNOR TO THE COPEMAN ELECTRIC STOVE COMPANY, OF FLINT, MICHIGAN, A CORPORATION OF MICHIGAN.

AUTOMATICALLY-CONTROLLED ELECTRIC COOKING APPARATUS.

1,180,571.　　　Specification of Letters Patent.　　Patented Apr. 25, 1916.

Application filed May 18, 1911. Serial No. 627,926.

*To all whom it may concern:*

Be it known that I, LLOYD G. COPEMAN, a citizen of the United States of America, residing at Fort Smith, in the county of Sebastian and State of Arkansas, have invented certain new and useful Improvements in Automatically-Controlled Electric Cooking Apparatus, of which the following is a specification, reference being had thereto in the accompanying drawings.

It is object of the invention to provide automatic controlling means for electrically heated cooking apparatus by which first, the current is turned on automatically at a predetermined time, second, after the accumulation or storage of sufficient heat to complete the cooking, the current is automatically cut-out. These objects are attained by the peculiar construction, arrangement and combination of parts as hereinafter set forth.

In the drawings, Figure 1 is a diagrammatic view illustrating an electrically heated oven and the automatic control mechanism applied thereto; Fig. 2 is an elevation of the time controlled switch operating mechanism.

My improvement is more particularly designed for use in cooking of food where it is desired to prepare the same at any predetermined time. For instance food to be cooked for breakfast may be placed in the apparatus the night before and the heat turned on automatically to complete the operation at the desired time. It is however, important to guard against any over heating effect, and one of the features of my improvement provides for this by thermically controlled means for opening the electric circuit when sufficient heat has been stored to complete the operation.

As illustrated in Fig. 1, A is an oven of any suitable construction and provided with an electric heating unit, diagrammatically represented at B. C is the electric circuit in which the unit B is included and which is controlled by an automatically closing switch D, and preferably also by one or more thermically operated circuit opening devices. As shown in Fig. 1 the circuit opener includes a thermostatic switch E controlling a branch electric circuit F, and in this branch circuit is a solenoid G which actuates a latch H controlling a spring actuated automatically opening switch I, said switch in turn controlling the main electric circuit C. The arrangement is such that when the thermostatic switch E is operated by a temperature rise so as to close the circuit F, this by energizing the solenoid G will release the switch I which will open and break the main circuit. The closing switch D as shown is separate and distinct from the switch I but is in series therewith in the same electric circuit. This switch D is automatically closed by a timed mechanism illustrated in detail in Fig. 2 and comprising preferably an ordinary alarm clock J having an alarm winding stem K, a time winding stem L and a setting mechanism knob L'. To the winding stem K is secured a lever arm M having a roll or other projection N adapted to impinge against the handle O of the switch D, and during the movement of the lever to move said handle so as to close the switch. For holding the clock and switch in the proper relative position the latter is preferably mounted upon a portion of the frame P of the cooker and this frame is also provided with clips Q with which the legs R of the clock may be detachably engaged.

With the construction described in use, the operator may place the food to be cooked in the oven A opening the switch O and adjusting the alarm clock in operative relation thereto as shown in Fig. 2. The switch I is closed and is held in this position by the latch H, but the electric circuit for the heating element B is opened by reason of the position of the switch D. If it is desired to have the cooking completed at any particular hour, the alarm setting device for the clock is adjusted to a time sufficiently in advance of this hour, after which no further attention is required. At the time at which the alarm mechanism is set, the lever M will be released and will be actuated by the rotation of the stem K so as to move the handle O and close the switch D. This will complete the circuit through the heating unit B and heat will be constantly generated until the temperature rise is sufficient to operate the thermostatic switch E. When this occurs the circuit F is closed, energizing the solenoid G, releasing the latch H and permitting the spring to automatically open the switch I. Thus if for any reason the operator is delayed in removing the food from the oven it will not be injured by over heating.

It is obvious that the time controlled switch may be employed without use of the thermostatic control, but it would then be necessary for an attendant to either open the circuit or remove the food at a particular time to avoid over heating.

What I claim as my invention is:

1. The combination with an electric cooking apparatus provided with an electric circuit, of a controlling switch therefor, mechanism for closing said switch at a predetermined time, and thermically controlled means for opening the circuit.

2. The combination with an electric cooking apparatus and a controlling switch therefor, of mechanism for closing said switch at a predetermined time, a solenoid-operated switch arranged in the same circuit as said controlling switch, and thermostatic means for operating the solenoid to open the circuit through both the electric cooking apparatus and said thermostatic means.

3. In an electric cooking apparatus, the combination with an electric heater and its circuit including a controlling switch mechanism for closing said switch at a predetermined time, a branch circuit of said first-mentioned circuit, a second switch controlling both the main and branch circuits, a normally open thermostatic switch in said branch circuit, and a solenoid in the latter circuit controlling the second switch.

4. The combination with an electric cooking apparatus, of two switches controlling the circuit thereof, one being initially open and the other initially closed, mechanism for closing said initially open switch at a predetermined time, and thermically controlled means for opening said initially closed switch when a predetermined temperature is attained.

In testimony whereof I affix my signature in presence of two witnesses.

LLOYD GROFF COPEMAN.

Witnesses:
BERTHA SHEPNER,
W. E. MARTIN.